United States Patent Office 2,798,801
Patented July 9, 1957

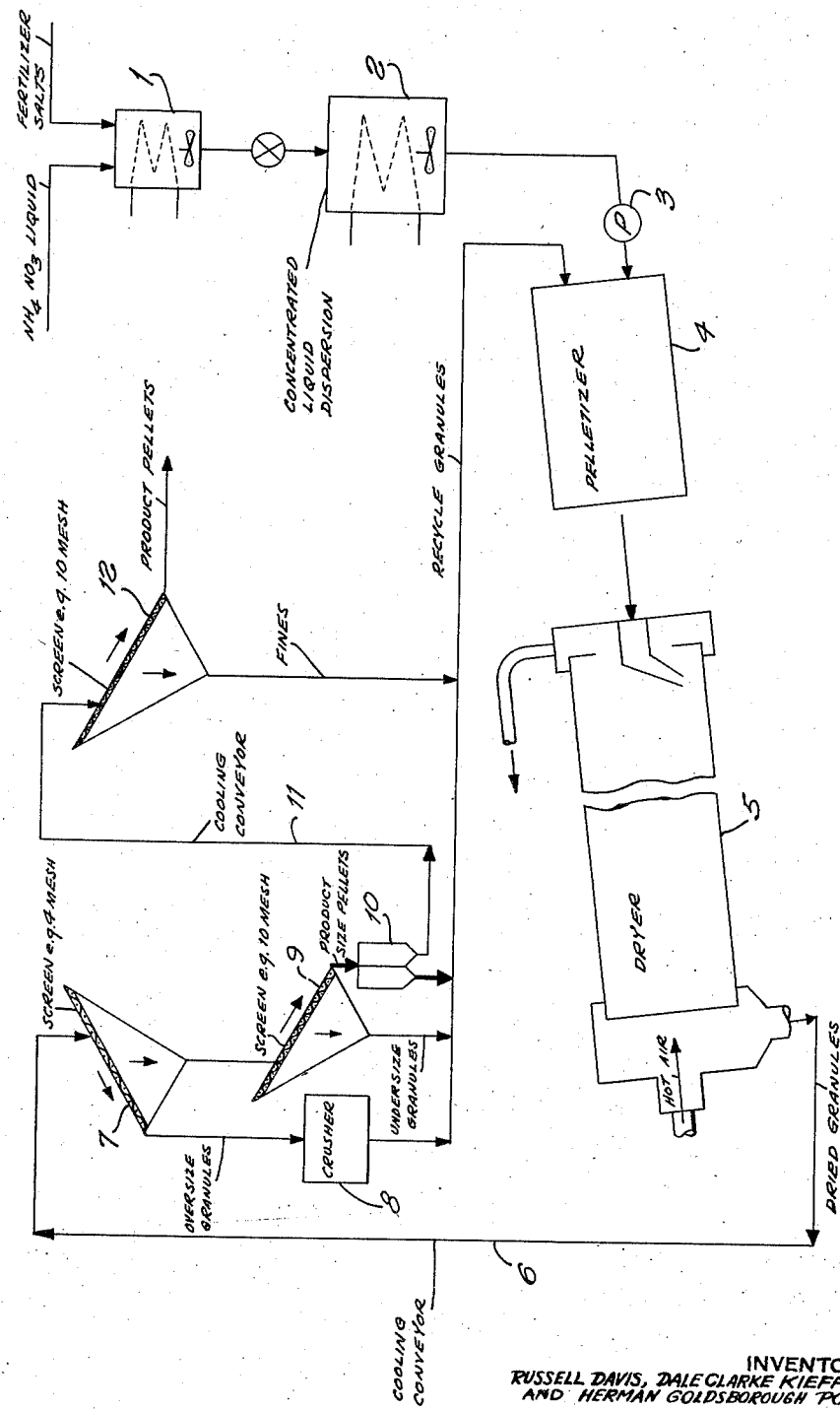

2,798,801

PRODUCTION OF PELLETIZED NITROGENOUS FERTILIZERS

Dale Clarke Kieffer, Russell Davis, and Herman Goldsborough Powers, Norfolk, Va., assignors to Smith-Douglass Company, Inc., Norfolk, Va., a corporation of Virginia Application December 30, 1953, Serial No. 401,166

10 Claims. (Cl. 71—64)

This invention relates to a process for continuously producing pellets of fertilizer compositions which contain as a principal ingredient a hygroscopic nitrogenous salt such as ammonium nitrate. More particularly, it relates to the continuous production of pelletized mixed fertilizers containing a hygroscopic nitrogenous salt and other fertilizer ingredients such as potassium and/or phosphorus compounds.

Serious problems are encountered in attempts to pelletize such fertilizers. The raw materials used have troublesome tendencies to form agglomerates or cakes and to encrust the pelletizing apparatus, and large proportions of the formed granules do not have the particle size which is desired for the efficient use of pelletized fertilizers.

The principal object of this invention is to provide a process for overcoming those problems, by which fertilizer compositions containing ingredients of the types mentioned can be pelletized continuously and in a highly efficient and economical manner.

Another object of the invention is to provide a process for continuously producing valuable pelletized fertilizers from relatively inexpensive sources of nitrogen, phosphate and potassium, such as ammonium nitrate, anhydrous ammonia, potassium chloride, phosphoric acid, superphosphate, and slurries of acid and phosphate rock.

A further object of the invention is to produce such pelletized fertilizers which are useful as top dressings for general crop use and of which practically all the particles have a size small enough to pass through the farmer's drill yet large enough not to stick to crop foliage.

According to the present invention, pellets of fertilizer compositions containing a hygroscopic nitrogenous salt such as ammonium nitrate are produced continuously and in a desired size range, by forming at an elevated temperature a liquid dispersion of the desired composition, having as its base a concentrated solution of the hygroscopic salt and so concentrated that it crystallizes at room temperature, then continuously mixing and tumbling a stream of this dispersion with a mass at least several times greater of preformed dried granules of the same composition, and continuing the tumbling until substantially the entire mixture is formed into distinct granules. The granules thus formed are then dried continuously, preferably while being subjected to further tumbling action and exposed to a drying atmosphere at an elevated temperature, so as to obtain dried granules composed predominantly of pellets in the desired size range; after which a minor proportion of these pellets equivalent to the inflow of solids in the concentrated liquid dispersion is separated and discharged from the process as a "product cut" while a major proportion of these pellets and other parts of the formed granules are mixed continuously with the inflowing stream of said liquid dispersion in the continued operation of the process.

It is an important feature of this process that the hygroscopic ammonium salt and other desired ingredients of the fertilizer composition be supplied to the preformed granules in the form of a concentrated liquid dispersion that will coat these granules and quickly solidify on them in the course of the mixing and tumbling action. The dispersion preferably is so concentrated that it will crystallize at temperatures substantially above room temperature, say at 140° to 150° F., and it should be mixed with such a large quantity of the preformed granules that the moisture content of the mixture formed will be within the narrow range of about 1.5 to 4%. A further important feature consists in maintaining continuously in the material a large preponderance of pellets within the size range of minus 4 plus 20 screen mesh and thus limiting strictly the amount of fine particles supplied to the material. In general, the preformed granules mixed with the liquid dispersion should always contain less than about 12% of particles of minus 20 mesh or smaller screen size.

A continuous pelletizing action with continuous control of the size of the pellets formed is brought about in this process through the continually repeated coating of the recirculated granules with films of the concentrated liquid dispersion, which films solidify immediately on the granules and then are dried efficiently by a simple surface drying operation. To operate in the manner described entails the continuous recirculation to the pelletizing apparatus of most of the pellets discharged from that apparatus, but in this way an effective rabbling action is obtained which prevents the objectionable agglomeration of particles and the growth of crusts on the apparatus used; and in the course of this action, not only the inflowing dispersion but also the limited proportion of fines or undersize particles among the preformed granules is consolidated continuously into granules which predominantly are within the size range desired for the pelletized end product.

Parts of the formed granules larger than the desired size advantageously are separated from the formed pellets and then crushed into smaller particles, whereupon these crushed granules and the undersize particles or fines among the formed granules, together with most of the pellets in the desired size range of minus 4 plus 20 mesh, are returned for admixture with the inflowing dispersion in the continued operation of the process.

The process of this invention may be used advantageously for pelletizing a wide variety of fertilizer compositions containing hygroscopic and heat sensitive ingredients. It can be used for the production of pellets of compositions rich in nitrogen and potassium, or for pelletizing complete high analysis fertilizers rich in available nitrogen, potassium and phosphorus. Among the mixtures of fertilizer ingredients that can be pelletized efficiently are mixtures containing substantial quantities of ammonium nitrate together with other ammonium salts such as ammonium sulfate and/or potassium salts such as potassium chloride or potassium sulfate, and/or phosphorus compounds such as superphosphates (treble or simple) or phosphoric acid, and slurries of acids neutralized with phosphate and/or ammonia; and various carriers or diluent substances may be present with such ingredients.

Other objects, features and advantages of this invention will be apparent from the following detailed description of an illustrative embodiment thereof.

The following description refers to the accompanying diagrammatic flow chart which shows features of a plant suitable for continuously producing pellets of a 14–0–14 fertilizer composition according to this invention by the use of ammonium nitrate, potassium chloride and dolomite lime as the fertilizer ingredients.

As illustrated in the drawing, the formation of the fertilizer ingredients into a concentrated liquid dispersion is carried out batchwise in the mixing tank at 1. A stream of a concentrated ammonium nitrate liquid or melt is mixed in this tank with desired proportions of finely divided KCl and finely divided dolomite lime, while these materials are stirred and heated continuously so as to keep the formed dispersion in a liquid state. For example, the $NH_4NO_3$ liquid or melt may be formed by melting 3320 pounds per hour of $NH_4NO_3$ with 800 pounds per hour of water, at 180° F., and the resulting liquid may be mixed in tank 1 with 1837 pounds per hour of fertilizer grade KCl and 2163 pounds per hour of dolomite lime. The ingredients are well agitated in tank 1 at a temperature of 160° to 200° F. until a highly concentrated liquid dispersion or slurry is formed. This highly concentrated liquid dispersion has a very low moisture content, for example, of 9.5%, and it crystallizes when its temperature is below 150° F. In general, its moisture content should be kept below 14% and preferably in the range of about 7 to 12%, depending largely upon the amount of preformed dry granules used in the process. It is particularly important to avoid the presence of too much water in the dispersion; for an amount of water in excess of about 4% of the weight of the mixture formed in the pelletizer is quite detrimental in the pelletizing operation. The desired low water content is readily achieved in the use of ammonium nitrate as the principal solute of the dispersion, by taking advantage of its characteristic high water solubility and relatively low melting temperature.

After the ingredients supplied into tank 1 are agitated thoroughly, they are introduced into a holding tank 2 where mixing is continued at a temperature of 160° to 200° F.

A stream of the heated liquid dispersion held in tank 2 is fed continuously, for example, by pump 3, into a rotating pelletizer drum 4 where the liquid dispersion is mixed and tumbled continuously with a much greater mass of preformed granules of the same fertilizer composition, these granules having been graded for use in the pelletizer drum as described below.

In starting the process, the system may be partially loaded with the dry ingredients. For example, lime and fertilizer grade potash may be continuously circulated through the pelletizing, drying and screening system while a proportionate amount of 80% ammonium nitrate solution is pumped on the dry material as it passes through the pelletizer drum. This is continued until approximately 75 to 80% of the material is in pelletized form and the recycle load reaches the desired level. Then the inflow of the liquid dispersion is started, and as it is fed continuously into the rotating drum a stream of the preferred granules also is fed continuously into the drum. The mass of granules thus supplied is enough to take up and cause the immediate solidification of the inflow of liquid dispersion and usually is about 7 to 12 times as great as the weight of material in the liquid inflow, the ratio in any particular operation depending upon the nature and proportions of the ingredients of the dispersion and the amount of water which it contains. In general, the ratio of the inflowing streams of granules and liquid dispersion is so regulated that the material obtained by combining them in the pelletizer contains about 1.5 to 4% of moisture.

The process may also be started on products that have been previously produced, by loading the pelletizing and drying system with dry preformed granules of a desired size or sizes in the range from minus 4 to plus 20 mesh.

The preformed granules present in and fed to drum 4 consist of product size pellets, together with a limited amount of recirculated undersize granules and crushed oversize granules. Pellets in the product size range of minus 4 to plus 20 mesh greatly predominate. As the materials are tumbled continuously in the pelletizer an intense rabbling and mixing action takes place, and in the course of this action the liquid dispersion wets and grows on all sizes of the preformed granules. At the same time, the fines or undersize particles among these granules for the most part are consolidated into relatively larger granules, some of which may comprise aggregations of fine particles but still are so small that they can be readily dried. It is important that there be no excess of fines in the system, for in that event the rabbling action is insufficient and the fines will form soft oversize agglomerates which are not completely dried in the ensuing drying steps and which easily adhere to and clog parts of the apparatus used in the process, thus preventing the desired continuous operation of the process. It has been found that the desired continuous operation can be maintained when the preformed granules fed to the pelletizer contain less than 12% of fines having a screen size of minus 20 mesh or smaller. If a substantially larger proportion of such fines is present, the desired results and continuity of operation are not maintained.

The materials in the rotating pelletizer are mixed and tumbled therein until substantially the entire mixture is formed into discrete granules, whereupon the formed granules are discharged continuously into a rotating dryer 5 in which tumbling action is continued while the granules are exposed to a countercurrent flow of a suitably heated drying atmosphere. Hot air may be used for the drying, its temperature preferably being as high as the composition of the granules will tolerate without being so softened as to induce agglomeration or caking in the dryer. Hot air supplied at a temperature of about 580° F. is effective in the embodiment here described.

The granules discharged from the pelletizer, in this embodiment, usually contain from 1.5 to 2% of moisture. In the dryer their moisture content is reduced to less than 0.5%.

Upon emerging from the dryer 5, the granules have a temperature of about 225° F., or even less in the case of some mixtures containing phosphate, but not in excess of 250° F. There is but little particle growth in the dryer, and few of the particles in it are agglomerated into oversize particles, due to the continuation of the tumbling and rabbling action.

The dried granules are discharged onto a cooling conveyor 6 where their temperature preferably is lowered about 10 to 15° F. in order to achieve some casehardening of the granules. In this way all the granules become hard enough to be classified efficiently into portions of different particles sizes. For so classifying them they are discharged from conveyor 6 to a screen system which comprises a coarse screen 7 and a finer screen 9. These screens, for example, are respectively 4 mesh and 10 mesh screens.

The whole flow of dried granules is passed to screen 7, from which the oversize or plus 4 mesh granules flow to a crusher 8. In the crusher the oversize granules are lightly crushed or ground into particles of smaller size suitable to be recycled into the pelletizer.

The minus 4 mesh granules which pass through screen 7 flow onto the finer screen 9 which separates pellets of the desired product size from the smaller particles among these granules.

The product size pellets, constituting in this example the plus 10 mesh fraction from screen 9, are passed into a proportioner 10 which is so operated as to divide the flow of these pellets continuously into two portions. One of these portions, forming a "product cut," is divided off at a rate equivalent to the rate of inflow of the fertilizer composition contained in the liquid dispersion entering the pelletizer. The other divided portion is passed continuously into the pelletizer, along with both the minus 10 mesh granules which pass through screen 9 and the crushed granules discharged from crusher 8, for continuous admixture in the pelletizer with the inflowing liquid fertilizer dispersion.

Meanwhile, the product pellets discharged from proportioner 10 are carried by another cooling conveyor 11 to a final product screen 12, for example, a 10-mesh screen, which removes any fines formed in the proportioning or the conveying of these pellets. The pellets flowing from this screen are ready to be coated in known manner with a protective substance, such as diatomaceous earth, and then to be packaged for shipment. The fines which pass through screen 12 are returned continuously into the pelletizer along with the other preformed granules mentioned above.

The influence of the particle size of the preformed granules fed into the pelletizer upon the continuity of the process and the nature of the product will be further understood from the following two tables. Table 1 shows typical screen analyses for the preformed granules recycled to the pelletizer, the granules discharged from the pelletizer and the granules discharged from the dryer, according to an example of the described process for producing a 14–0–14 fertilizer from $NH_4NO_3$, KCl and dolomite lime. Table 2 shows the comparable screen analyses in an operation not conforming with the recycling conditions of this invention but otherwise carried out in the manner of the example of Table 1.

Table 1

| Screen Size | Granules Recycled, Percent | Granules Discharged Pelletizer, Percent | Granules Discharged Dryer, Percent |
| --- | --- | --- | --- |
| On 3 | 0.0 | .9 | 2.3 |
| On 4 | 1.0 | .3 | 2.2 |
| On 6 | 7.3 | 15.0 | 17.3 |
| On 10 | 64.0 | 68.0 | 65.5 |
| On 20 | 21.5 | 15.2 | 12.0 |
| Thru 20 | 6.2 | .6 | .7 |
|  | 100.0 | 100.0 | 100.0 |

Table 2

| Screen Size | Granules Recycled, Percent | Granules Discharged Pelletizer, Percent | Granules Discharged Dryer, Percent |
| --- | --- | --- | --- |
| On 3 | .0 | 5.6 | 9.7 |
| On 4 | .4 | 1.9 | 1.9 |
| On 6 | 5.3 | 7.5 | 6.1 |
| On 10 | 39.3 | 42.2 | 42.3 |
| On 20 | 38.3 | 32.7 | 32.6 |
| Thru 20 | 16.7 | 10.1 | 7.4 |
|  | 100.0 | 100.0 | 100.0 |

From Table 1 it will be observed that the percentage of recycled granules in the size range of minus 4 mesh plus 10 mesh is approximately 71%, while the comparable percentage in Table 2 is only approximately 45%. In Table 1 the dried product comprises approximately 83% of pellets in that size range, i. e., approximately 12% more than the recycled granules, while in Table 2 the dried product comprises only slightly more than 48% of pellets in that size range, an increase of only about 3% over the proportion of such pellets in the recycled granules.

Table 1 also shows that the proportion of granules smaller than 20 mesh in the dried product according to the example of this invention was only about 0.7%, although the recycled granules comprised 6.2% of such undersize granules. On the other hand, according to the practice of Table 2, wherein the recycled granules contained 16.7% of minus 20 mesh granules, the dried product still comprised about 7.4% of undersize granules. Similarly, in Table 1 the proportion of oversize granules in the dried product is less than 5%, while in Table 2 it is more than 11%.

It is evident that the practice of Table 2, compared with that of Table 1, involves a far greater increase in the percentage of oversize granules in the dried product, over the percentage of oversize granules in the recycled material, and this particle growth or agglomeration occurs to a much greater extent in both the pelletizing and the drying phases of the operation.

If the operation is continued after the use of recycled granules having a screen analysis like that of Table 2, it results eventually in a condition which not only chokes the crusher but also will actually decrease the proportion of pellets of the desired size in the formed product, as compared with the proportion thereof in the recycled granules. In other words, the continuous operation of the process for the intended purpose is not practicable in that manner.

Various modifications of the details and examples set forth hereinabove will become apparent to those skilled in the art and may be resorted to without departing from the invention, which is intended to be defined by the appended claims.

What is claimed is:

1. A process for continuously producing pellets of a fertilizer composition containing a hygroscopic nitrogenous salt, which comprises forming at an elevated temperature a liquid dispersion of said composition having as its base an aqueous solution of said salt so concentrated that it crystallizes at room temperature, continuously mixing and tumbling with a stream of said liquid dispersion a mass at least several times greater, by weight, of preformed dried granules of said composition, said granules consisting predominantly of pellets in the size range of the desired product, thus forming coatings of said dispersion on said granules and immediately solidifying said coatings thereon, then continuously drying the coated granules.

2. A process for continuously producing pellets of a fertilizer composition containing a hygroscopic nitrogenous salt, which comprises forming at an elevated temperature a liquid dispersion of said composition having as its base an aqueous solution of said salt so concentrated that it crystallizes at room temperature, continuously mixing and tumbling with a stream of said liquid dispersion a mass at least several times greater, by weight, of preformed dried granules of said composition, said granules consisting predominantly of pellets in the size range of the desired product, thus forming coatings of said dispersion on said granules and immediately solidifying said coatings thereon, then continuously drying the coated granules by tumbling them further in a drying atmosphere.

3. A process for continuously producing pellets predominantly in the size range of from minus 4 to plus 20 mesh screen size, of a fertilizer composition containing a hygroscopic nitrogenous salt, which comprises forming at an elevated temperature a liquid dispersion of said composition having as its base an aqueous solution of said salt so concentrated that it crystallizes at room temperature, continuously mixing with a stream of said liquid dispersion a stream at least several times greater, by weight, of preformed dried granules of said composition and tumbling the mixture until it is formed substantially entirely into distinct granules, said preformed granules consisting predominantly of pellets within the size range of minus 4 plus 20 screen mesh and containing less than 12% of particles as small as minus 20 mesh screen size, then continuously drying the formed granules by tumbling them further in a drying atmosphere.

4. A process for continuously producing pellets of a fertilizer composition containing a hygroscopic nitrogenous salt, which comprises forming at an elevated temperature a liquid dispersion of said composition having as its base an aqueous solution of said salt so concentrated that it crystallizes at room temperature, continuously mixing with a stream of said liquid dispersion a stream at least several times greater, by weight, of preformed dried granules of said composition and tumbling the mixture until it is formed substantially entirely into distinct granules, said preformed granules containing less than 12% of particles as small as minus 20 mesh screen size, then continuously drying the formed granules by tumbling them further in a drying atmosphere, thereafter continuously taking off a minor portion of the dried granules having substantially all its particles in a desired size range larger than minus 20 mesh, said portion being taken off at a rate equivalent to the rate of continued supply of said composition in said liquid dispersion, and continuously returning and using a major portion of the dried granules, consisting predominantly of pellets within said desired size range, as said stream of preformed dried granules in the continued operation of the process.

5. A process for continuously producing pellets of a fertilizer composition containing ammonium nitrate, which comprises forming at an elevated temperature a liquid dispersion of said composition having as its base an aqueous solution of ammonium nitrate so concentrated that it crystallizes at room temperature, continuously mixing and tumbling with a stream of said liquid dispersion a stream at least several times greater, by weight, of preformed dried granules of said composition, said granules consisting predominantly of pellets in the size range of the desired product, said streams being so proportioned that the tumbling preformed granules take up and cause the immediate solidification of coatings of said dispersion, and continuously drying the granules thus formed by tumbling them in a drying atmosphere.

6. A process for continuously producing pellets of a fertilizer composition containing ammonium nitrate, which comprises forming at an elevated temperature a liquid dispersion of said composition having as its base an aqueous solution of ammonium nitrate so concentrated that it crystallizes at room temperature, continuously mixing and tumbling with a stream of said dispersion a stream at least several times greater, by weight, of preformed dried granules of said composition, said granules consisting predominantly of pellets in the size range of the desired product, said streams being so proportioned that the mixture thereof contains not more than about 4% of water, continuing said tumbling until the mixture is formed substantially entirely into distinct granules, and continuously drying the formed granules by tumbling them in a drying atmosphere.

7. A process for continuously producing pellets predominantly in the size range of from minus 4 to plus 20 mesh screen size, of a fertilizer composition containing ammonium nitrate, which comprises forming at an elevated temperature a liquid dispersion of said composition having as its base an aqueous solution of ammonium nitrate so concentrated that it crystallizes at 140° to 150° F., said dispersion containing about 7 to 12% of water, continuously mixing and tumbling with a stream of said dispersion a stream at least several times greater, by weight, of preformed dried granules of said composition, said preformed granules consisting predominantly of pellets within the size range of minus 4 plus 20 screen mesh and containing less than 12% by weight of particles as small as minus 20 mesh screen size and said streams being so proportioned that the mixture thereof contains not more than about 4% of water, continuing said tumbling until the mixture is formed substantially entirely into distinct granules, and continuously drying the formed granules by tumbling them in a drying atmosphere.

8. A process for continuously producing pellets predominantly in the size range of from minus 4 to plus 20 mesh screen size, of a fertilizer composition containing a hygroscopic nitrogenous salt, which comprises forming at an elevated temperature a liquid dispersion of said composition having as its base an aqueous solution of said salt so concentrated that it crystallizes at 140° to 150° F., said dispersion containing about 7 to 12% of water, continuously mixing and tumbling with a stream of said dispersion a stream of preformed dried granules of said composition so predominating in mass that the resulting mixture contains not more than about 4% of water, said preformed granules containing less than 12% by weight of particles as small as minus 20 mesh, continuing the tumbling until the mixture is formed substantially entirely into distinct granules, thereafter continuously tumbling the formed granules in a drying atmosphere at an elevated temperature, thereafter classifying them to obtain separate portions consisting respectively of dried pellets having desired sizes within the aforesaid size range, oversize granules and undersize granules, crushing said oversize granules, taking off from the process a minor proportion of said dried pellets substantially equivalent to the amount of said composition entering the process in said stream, and mixing the remainder of said dried pellets, said undersize granules and the crushed oversize granules with said dispersion stream, as said stream of preformed dried granules, in continuation of the process.

9. A process for continuously producing pellets predominantly in the size range of from minus 4 to plus 20 mesh screen size, of a fertilizer composition containing a hygroscopic nitrogenous salt, which comprises forming at an elevated temperature a liquid dispersion of said composition having as its base an aqueous solution of said salt so concentrated that it crystallizes at room temperature, said dispersion containing about 7 to 12% of water, continuously mixing and tumbling with a stream of said dispersion a stream of preformed dried granules of said composition so predominating in mass that the resulting mixture contains not more than about 4% of water, said preformed granules containing less than 12% by weight of particles as small as minus 20 mesh, continuing the tumbling until the mixture is formed substantially entirely into distinct granules, thereafter continuously tumbling the formed granules in a drying atmosphere at an elevated temperature, cooling the dried granules to harden them, thereafter classifying them to obtain separate portions consisting respectively of dried pellets having desired sizes within the aforesaid size range, oversize granules and undersize granules, crushing said oversize granules, taking off from the process a minor proportion of said dried pellets substantially equivalent to the amount of said composition entering the process in said stream, and mixing the remainder of said dried pellets, said undersize granules and the crushed oversize granules with said dispersion stream, as said stream of preformed dried granules, in continuation of the process.

10. A process for continuously producing pellets of a fertilizer composition containing ammonium nitrate and potassium chloride, which comprises forming at an elevated temperature a liquid dispersion of said composition that contains less than 14% of water and crystallizes at 140° to 150° F., continuously mixing and tumbling with a stream of said dispersion from 7 to 12 times as much, by weight, of preformed dried granules of said composition, said granules consisting predominantly of pellets in the size range of minus 4 mesh to plus 20 mesh and containing less than 12% of particles as small as minus 20 mesh, continuing said tumbling until the mixture is formed substantially entirely into distinct granules, then continuously tumbling the formed granules in a drying atmosphere at an elevated temperature until their moisture content is below 0.5%, then cooling the dried granules to harden them, then continuously classifying them into separate portions consisting respectively of dried pellets having desired sizes within the aforesaid size range, oversize granules, and undersize granules, crushing said oversize granules, continuously taking off from the process an amount of said dried pellets substantially equivalent to the amount of said composition entering the process in said stream, and mixing the remainder of said dried pellets, said undersize granules and the crushed oversize granules with said dispersion stream, as said stream of preformed dried granules, in continuation of the process.

References Cited in the file of this patent

UNITED STATES PATENTS

| | | |
|---|---|---|
| 1,661,203 | Toniolo | Jan. 27, 1926 |
| 2,052,329 | Wendeborn | Aug. 25, 1936 |
| 2,164,986 | Cox et al. | July 4, 1939 |
| 2,287,759 | Hardesty et al. | June 23, 1942 |
| 2,382,298 | Datin | Aug. 14, 1945 |
| 2,399,987 | Cordie et al. | May 7, 1946 |
| 2,448,126 | Shoeld | Aug. 31, 1948 |
| 2,598,658 | Procter et al. | May 27, 1952 |

OTHER REFERENCES

Industrial and Engineering Chem., Production of Grained Ammonium Nitrate Fertilizer, Miller et al., vol. 38, No. 7, pages 709–718.